US005264273A

United States Patent [19]

Suzuki et al.

[11] Patent Number: 5,264,273

[45] Date of Patent: Nov. 23, 1993

[54] STRUCTURE OF A RECORDING MEDIUM FOR AN ELECTROSTATIC RECORDER

[75] Inventors: Tadahiro Suzuki, Kawasaki; Seiichi Miyakawa, Nagareyama; Kazuaki Iizuka, Tokyo; Kiyoshi Ohshima; Yoshiyumi Tamiya, both of Yokohama; Kenichi Shimizu, Kawasaki; Shigeru Suzuki, Yokohama, all of Japan

[73] Assignee: Ricoh Company, Ltd., Tokyo, Japan

[21] Appl. No.: 757,955

[22] Filed: Sep. 12, 1991

[30] Foreign Application Priority Data

Sep. 12, 1990 [JP] Japan ................................ 2-241946
Feb. 17, 1991 [JP] Japan ................................ 3-045887

[51] Int. Cl.[5] ................................ B32B 9/00

[52] U.S. Cl. ................................ 428/209; 428/195; 428/211; 428/913; 346/153.1

[58] Field of Search ............... 428/323, 415, 195, 207, 428/407, 209, 257, 211, 457, 537.5, 500, 404, 412, 330, 323, 913; 346/153.1, 155

[56] References Cited

U.S. PATENT DOCUMENTS 5,116,666 5/1992 Konno ................................ 428/323

*Primary Examiner*—Patrick J. Ryan
*Assistant Examiner*—W. Krynski
*Attorney, Agent, or Firm*—Oblon, Spivak, McClelland, Maier & Neustadt

[57] ABSTRACT

The structure of a sheet-like electrostatic recording medium which may be configured as a roll and connected to ground via an electrostatic recorder with which it is usable. A connecting member is provided on at least one of axially opposite ends of the roll of the recording medium and electrically connected to an external electrode which is mounted on the recorder.

14 Claims, 5 Drawing Sheets

STRUCTURE OF A RECORDING MEDIUM FOR AN ELECTROSTATIC RECORDER

BACKGROUND OF THE INVENTION

The present invention relates to the structure of a recording medium for use with an electrophotographic copier, facsimile apparatus, printer or similar recorder.

A recorder operable with an electrostatic recording medium in the form of a sheet is conventional. The electrostatic recording medium has at least a conductive layer and a dielectric layer formed on the conductive layer. The recorder electrostatically records a latent image on the dielectric layer of the recording medium and then develops it by a developing device to produce a visible image. With this kind of recorder, it is necessary to maintain the conductive layer at a predetermined potential allowing the conductive layer to play the role of an electrode, so that the resulting images may remain stable. To meet this requirement, it has been customary to implement the conductive layer by a substrate which is infiltrated with a conductive agent at both sides thereof, the dielectric layer being formed on the conductive layer. The conductive substrate is connected to ground via the recorder. This kind of recording medium transmits light partly because it is infiltrated with a conductive agent and partly because its substrate is thin. Hence, such a recording medium is not a desirable material except as a second original document. For example, to achieve a high quality full-color image, the recording medium should preferably be as white and glossy as photographic paper. While opacity, gloss, whiteness and smoothness are achievable if the substrate is implemented as a film of polyethylene phtalate or similar synthetic resin or synthetic paper, it is difficult to reduce the resistance of such a film or paper.

To promote accurate and dense recording, there is a demand for a film of synthetic resin or similar insulative substrate which is not susceptible to changes in ambient conditions. There has been proposed a recording medium which is a laminate of a dielectric layer, an insulative substrate such as a film of synthetic resin, and a conductive layer intervening between the dielectric layer and the substrate. The problem with such a laminate or recording medium is that the substrate which is insulative cannot be directly grounded. Some different approaches to connect the insulative substrate to ground have been proposed, as follows:

(1) omitting the dielectric layer over several millimeters from the widthwise edge so as to expose the conductive layer to the outside;
(2) applying a conductive agent which is a mixture of carbon black, metal powder or similar conductive particles and a resin to the so exposed portion to thereby form a conductive film;
(3) breaking part of the dielectric layer and inserting a conductive projection into the recording medium at the broken part; and
(4) mixing a small amount of conductive particles with the dielectric layer, in which case the connection to ground will be effected on the surface of the dielectric layer (e.g. Japanese Patent Laid-Open Publication Nos. 64647/1990 and 83547/1990).

However, the above-stated conventional approaches (1)-(3) have a drawback that part of the recording medium cannot be used to record an image thereon. Moreover, the approach (4) is likely to prevent a latent image from being formed in the area where the conductive particles exist or prevent a bias voltage from acting effectively in the developing device.

SUMMARY OF THE INVENTION

It is, therefore, an object of the present invention to provide an electrostatic recording medium which allows a high quality image to be formed over substantially the entire area thereof and can have the conductive area thereof connected to a recorder.

It is another object of the present invention to provide a generally improved electrophotographic recording medium for use with an electrostatic recorder.

In accordance with the present invention, a sheet-like electrostatic recording medium which may be configured as a roll comprises a conductive layer partly exposed to the outside at at least one of axially opposite ends of the roll of the recording medium, and a connecting member provided on the at least one end of the roll and electrically connected to the conductive layer.

Also, in accordance with the present invention, a sheet-like electrostatic recording medium which is usable with an electrostatic recorder and may be configured as a roll comprises a conductive layer partly exposed to the outside at at least one of axially opposite ends of the roll of the recording medium, and a connecting member for electrically connecting the conductive layer to the recorder.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENTS

Figure 9:
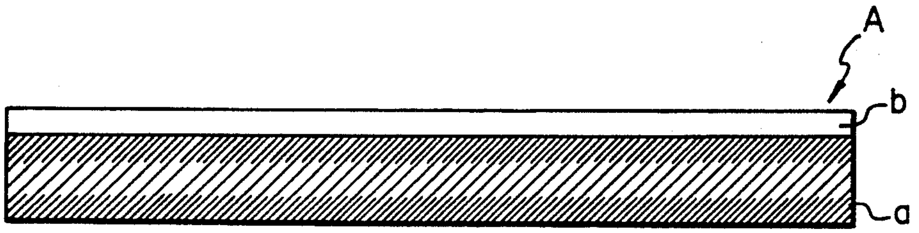
Fig. 9 PRIOR ART
FIG. 9 is a section of a conventional electrostatic recording medium having a conductive substrate and a dielectric layer.
Figure 10:
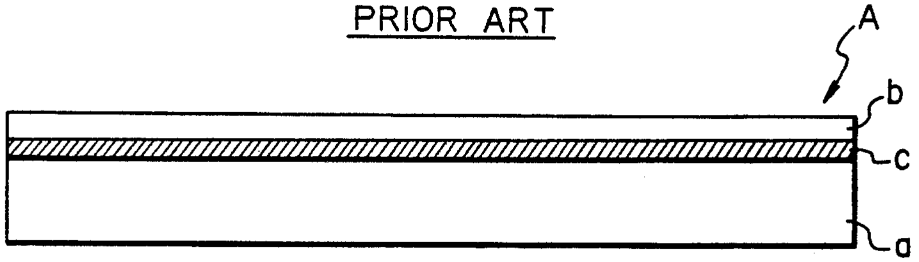
Fig. 10 PRIOR ART
FIG. 10 is a section of another conventional recording medium which is made up of an insulative substrate, a conductive layer, and a dielectric layer.

To better understand the present invention, a brief reference will be made to a conventional electrostatic recording medium, shown in FIG. 9. As shown, the recording medium, generally A, has a substrate a infiltrated with a conductive agent at both sides thereof, and a dielectric layer b formed on the conductive substrate a. The substrate a is connected to ground via the recorder. This kind of recording medium A transmits light partly because it is infiltrated with a conductive agent and partly because its substrate a is thin. Hence, such a recording medium is not a desirable material except as a second original document. On the other hand, as shown in FIG. 10, there has been proposed a recording medium A which is a laminate of a dielectric layer b, an insulative substrate a such as a film of synthetic resin, and a conductive layer c intervening between the dielectric layer b and the substrate a. The problem with such a laminate or recording medium A is that the substrate a cannot be directly connected to ground. The approaches heretofore proposed to eliminate this problem as discussed earlier are not fully satisfactory.

Figure 11:
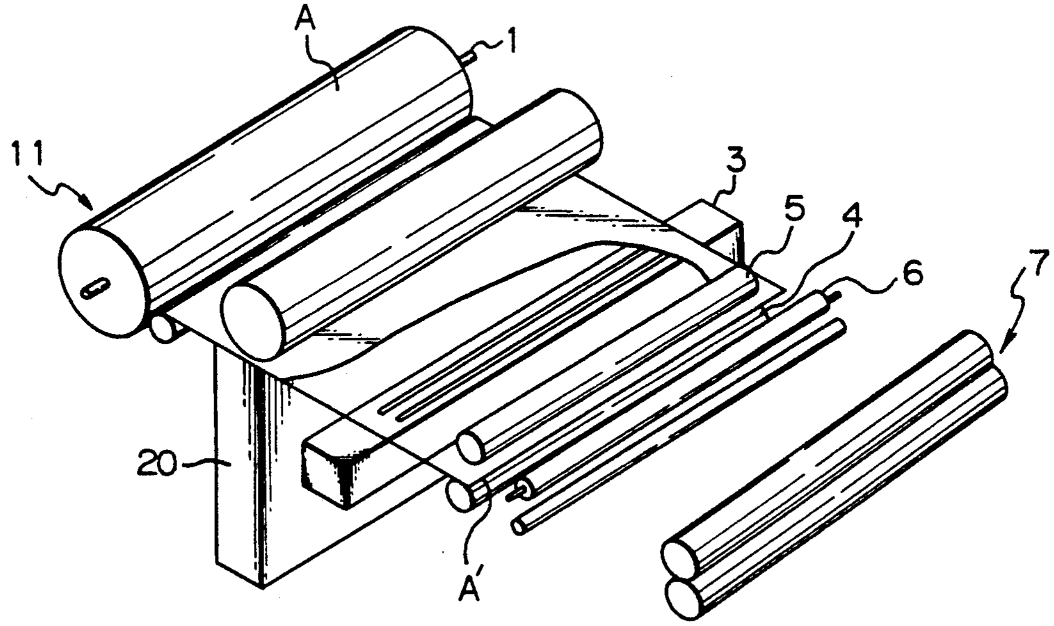
FIG. 11 is a perspective view of an electrostatic recorder to which the embodiments of the present invention are applicable.

A reference will be made to FIG. 11 for describing the construction of an ordinary electrostatic recorder to which various embodiments of the present invention are applicable. As shown, the recorder has a supply shaft 1 loaded with a roll 11 of recording medium A, a record head 2, a develop head 3, a drive roller 4 and a pinch roller 5 provided in a pair, a cutter 6, and a discharge roller pair 7. First, the medium A is paid out from the roll 11 on the supply shaft 1 to the drive roller 4 and pinch roller 5 by way of the record head 2 and develop head 3. The leading edge A' of the medium A is nipped by the drive roller 4 and pinch roller 5. In this condition, the recorder waits for the start of an image forming operation. On the start of an image forming operation, the drive roller 4 starts rotating. Then, the record head 2 electrostatically forms a latent image on the medium A, and the develop head 3 develops the latent image. As the medium A is sequentially paid out and just before the leading edge of the developed image reaches the cutter 6, the cutter 6 is operated to cut off the needless portion of the medium A that precedes the image. Just after the trailing edge of the image has moved away from the cutter 6, the rotation of the drive roller 4 is stopped while the cutter 6 is operated again to cut the medium A. Thereafter, only the discharge roller pair 7 is driven to drive the cut length of medium A, i.e., a sheet to a tray, not shown.

The present invention uses the laminate of insulative substrate a, dielectric layer b and conductive layer c, FIG. 10, configures the laminate such that the conductive layer c is exposed to the outside at least one of opposite side edges of the laminate, and rolls such a laminate.

Figure 1A:
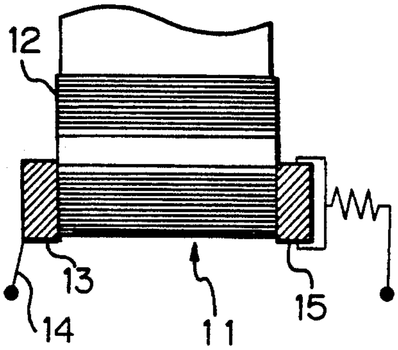
FIGS. 1A through 1C are sections each showing a specific configuration of an external electrode for connecting the conductive layer of an electrostatic recording medium to a recorder.
Figure 1B:
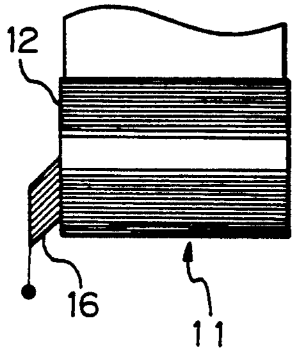
Figure 1C:
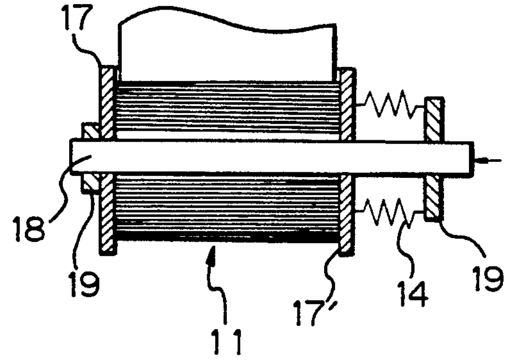
Figure 2A:
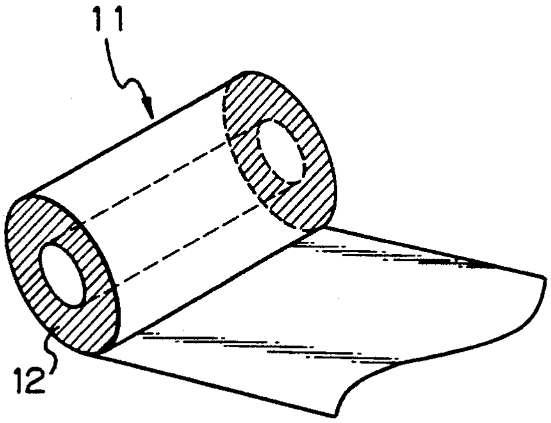
FIG. 2A is a perspective view of a recording medium embodying the present invention and implemented as a roll.

Referring to FIG. 2A, a first embodiment of the present invention will be described. As shown, the roll 11 of recording medium A is mounted on the recorder with the conductive layer c of the medium A exposed to the outside at least one 12 of axially opposite ends of the roll 11. The medium A is paid out from the roll 11, as illustrated. To ground the conductive layer c of the medium A via the recorder, an electrode mounted on the recorder (referred to as an external electrode hereinafter) is held in contact with the end 12 of the roll 12. FIGS. 1A through 1C each shows a specific configuration of the external electrode. In FIG. 1A, the external electrode is implemented as a conductor 13 such as metal, conductive rubber or carbon, and a resilient member 14 constantly urging the conductor 13 against the roll end 12. A roller 15 is pressed against the other roll end in order to reduce the sliding friction. Since the moving speed of the roll 11 sequentially changes in the radial direction thereof, slip should be reduced by, for example, causing the side of the roller 15 to contact the periphery (circumference) of the roll end 12 or sequentially reducing the diameter of the roller 15 toward the center of the roll 11, i.e., providing it with a conical shape. In FIG. 1B, the external electrode is constituted by a brush 16 which is an elastic conductor and pressed against the roll end 12. The brush 16 accurately follows even minute projections and recesses of the roll end 12 and, therefore, insures the connection of the conductive layer c to ground even when the medium A is not neatly rolled up. Further, in FIG. 1C, the external electrode is made up of a conductive rotary disk 17, an elastic member 14, and a stop 19. The conductive disk 17 is configured integrally with a shaft 18 which supports the roll 11 (let the parts rotatable integrally with the shaft 18 be also considered as part of the shaft 18). Specifically, the conductive disk 17 is held in contact with one roll end 12 by the elastic member 14 and stop 19. Hence, the conductive layer c is grounded via the disk 17, stop 19, and shaft 18. Alternatively, the conductive layer c may be grounded via a conductive rotary disk 17' abutting against the other roller end 12, a conductive spring stop 19', and the conductive member or spring 14.

As stated above, in the illustrative embodiment, the conductor 13, brush 16, disk 17 or similar conductor is held in direct contact with one of axially opposite ends 12 of the roll 11 at a plurality of points or along a plurality of lines. This sets up sufficient conduction between the conductive layer c of the medium A and the conductor although the conductor may locally fail to contact the roll end 12. Moreover, the external electrode contacts the end of the roll 11, as distinguished from the edge of the part of the medium A having been paid out from the roll 11. Hence, good electrical connection is realized despite that a relatively high pressure is exerted on the roll 11 sideways. It should be noted that since the conductive layer c appearing on the side edges of the medium A is as thin as 1 micron to 10 microns, it is difficult to surely set up the electrical connection between the conductive layer c and the external electrode by applying to the portion of the medium A having been paid out from the roll 11 a pressure sideways which does not bend the medium A.

Figure 2B:
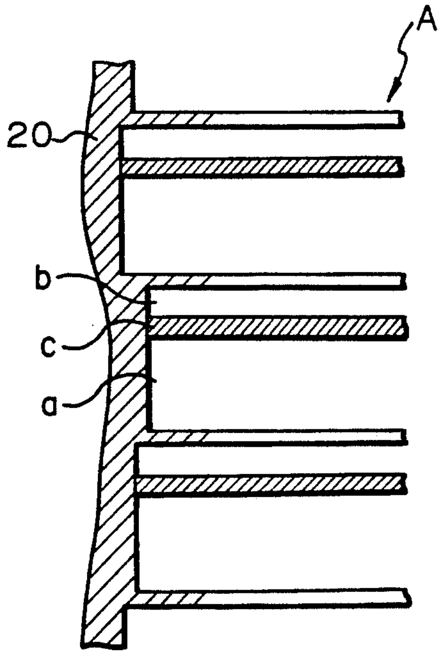
FIG. 2B is a fragmentary section of a roll of recording medium representative of a second embodiment of the present invention.

Referring to FIG. 2B, a second embodiment of the present invention is shown and includes a conductive agent 20. Specifically, after the medium A has been rolled up, the conductive agent 20 is applied to the entire area or part of at least one end of the resulting roll 11. The conductive agent 20 applied in a layer has a relatively low film forming strength and is easy to shear when the medium A is paid out from the roll 11. The conductive agent 20 should be selected in due consideration of the infiltrativity thereof which depends on the viscosity and surface tension. Should the infiltrativity be excessive, the agent 20 would enter the interstice between the successive turns of the medium 20 in a great amount to prevent part of the medium A from forming an image thereon or to contaminate it. Preferably, the agent 20 is identical in color with the medium A or is transparent. The external electrode will be held in contact with such an agent on the roll end 12 to connect the conductive layer c of the medium A to ground via the recorder. This embodiment surely connects the successive layers even when the roll end 12 is not precisely flat.

Figure 3A:
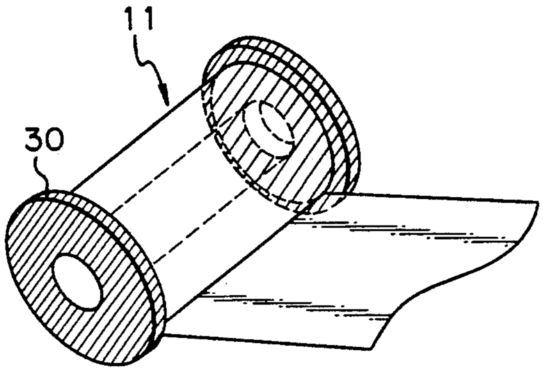
FIG. 3A is a perspective view of a roll of recording medium representative of a third embodiment of the present invention.
Figure 3B:
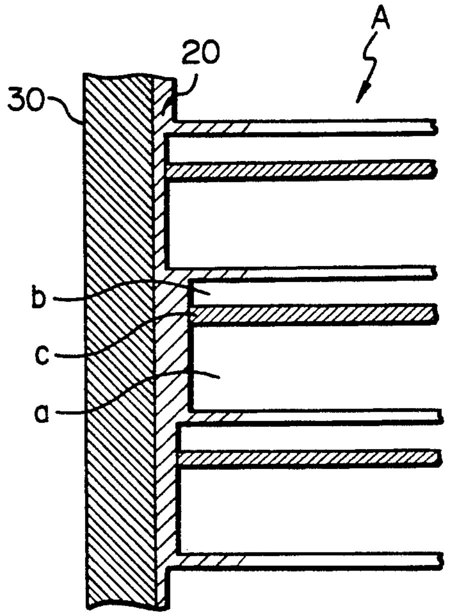
FIG. 3B is a fragmentary section of the roll shown in FIG. 3A.

FIGS. 3A and 3B show a third embodiment of the present invention which has a metallic plate or metallic foil (referred to as a conductive plate 30 hereinafter) on the roll end 12. Specifically, the medium A is paid out from the roll 11 on the end 12 on which a conductive plate 30 is provided, as shown in FIG. 3A. As shown in FIG. 3B, the conductive agent is disposed between the roll end 12 and the conductive plate 30. It is not always necessary for the conductive plate 30 to cover the entire roll end 12. To hold the conductive plate 30 in contact with the roll end 12 or the intervening conductive agent 20, the former may be pressed against the latter or may be adhered to the latter by adhesive or an adhering conductive agent. The external electrode mounted on the recorder contacts the conductive plate 30 to ground the conductive layer c of the medium A. The external electrode may be configured as shown in any one of FIGS. 1A through 1C by way of example. The conductive plate 30 allows the external electrode and the conductive layer c to be surely electrically connected to each other. In the configuration shown in FIGS. 3A and 3B, the conductive plate 30 may be extended to the inner periphery of the core (hollow) of the roll 11 so as to hold it in contact with a shaft supporting the roll 11. Especially, adhering the metallic foil to the roll end 12 by conductive adhesive and adhering part thereof to the shaft is successful in promoting easy production and setting up electrical connection at low cost. While the above description has concentration on a roll which lacks a core member, the medium A may be wound around a hollow cylindrical core member or a rod-like core member.

Figure 4A:
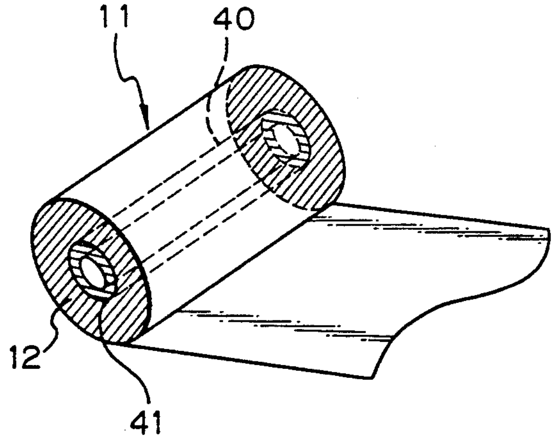
FIG. 4A is a perspective view of a roll of recording medium representative of a fourth embodiment of the present invention.
Figure 4B:
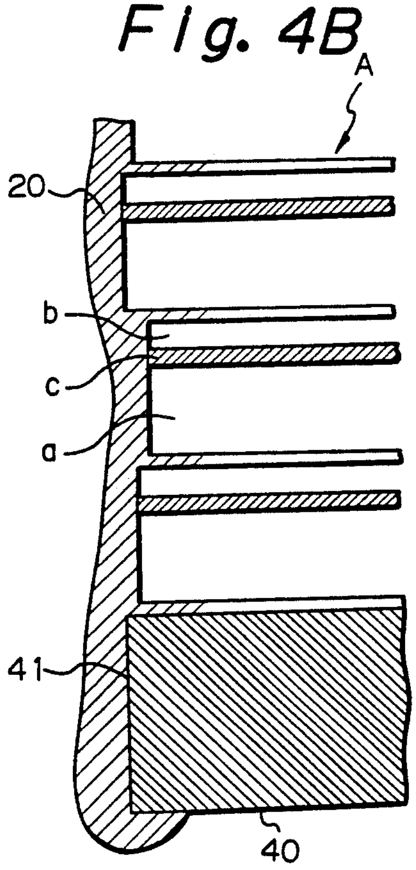
FIG. 4B is a fragmentary section associated with FIG. 4A.
Figure 5:
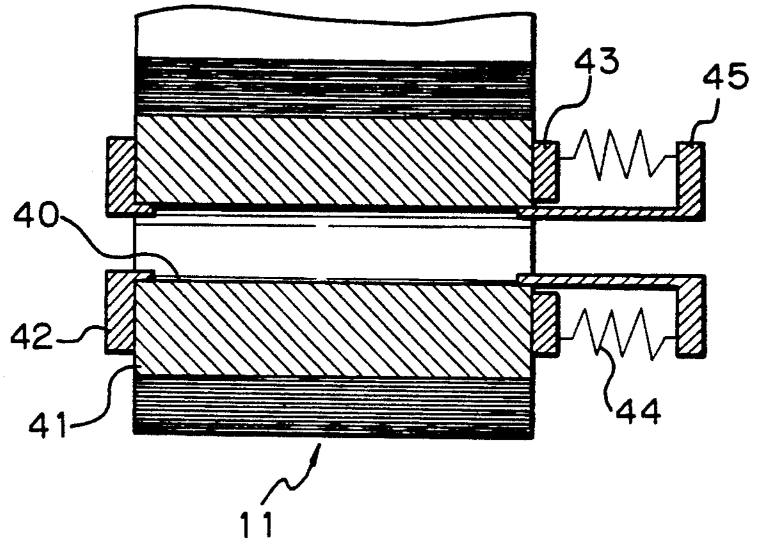
FIG. 5 is a section showing a specific construction of an external electrode suitable for the connection of the roll shown in FIGS. 4A and 4B to a recorder.

FIGS. 4A and 4B show a fourth embodiment of the present invention in which the medium is wound around a hollow cylindrical core member 40. As shown, the conductive agent 20 is applied from the roll end 12 to the end 41 of the core member 40 to electrically connect the ends 12 and 14 to each other. Specifically, FIG. 4A shows the roll 11 in a condition wherein the medium A is partly paid out from the roll 11 which is wound round the hollow cylindrical core member 40. As shown in FIG. 4B, the conductive agent 20 is applied from the roll end 12 to the end 41 of the core member 40. FIG. 5 shows a specific configuration of the external electrode which is suitable for this embodiment. As shown, the external electrode is connected to the conductive agent 20 which exists on the end 41 of the core member 40. The core member 40 is mounted on a shaft, not shown, which is mounted on the recorder. A conductive stop 42 is mounted on the shaft at the left-hand side of the roll 11, as viewed in the figure. The core member 40 carrying the roll 11 thereon is coupled over the shaft until the left end thereof abuts against the stop 42. Subsequently, a stop made up of an electrode 43, a metallic spring or resilient conductor 44 and a conductive metallic flange 45 is coupled over the shaft at the right-hand side of the roll 11. As a result, the stops 42 and 43 contact the conductive agent 20 existing on opposite ends 41 of the core member 40, grounding the conductive layer c via the recorder. While the conductors 42 and 43 may be pressed against the roll ends 12, such a configuration is apt to bend the medium A due to a thrust load or to increase the load in the event of pay-out. This embodiment frees the medium A from loads since it urges the conductors 42 and 43 against the ends 41 of the core member 40 which are electrically connected to the roll ends 12 by the conductive agent 20. Although the electrical conduction is shown as being set up at both ends of the core member 40, it may, of course, be set up at only one end of the core member 40.

Figure 6:
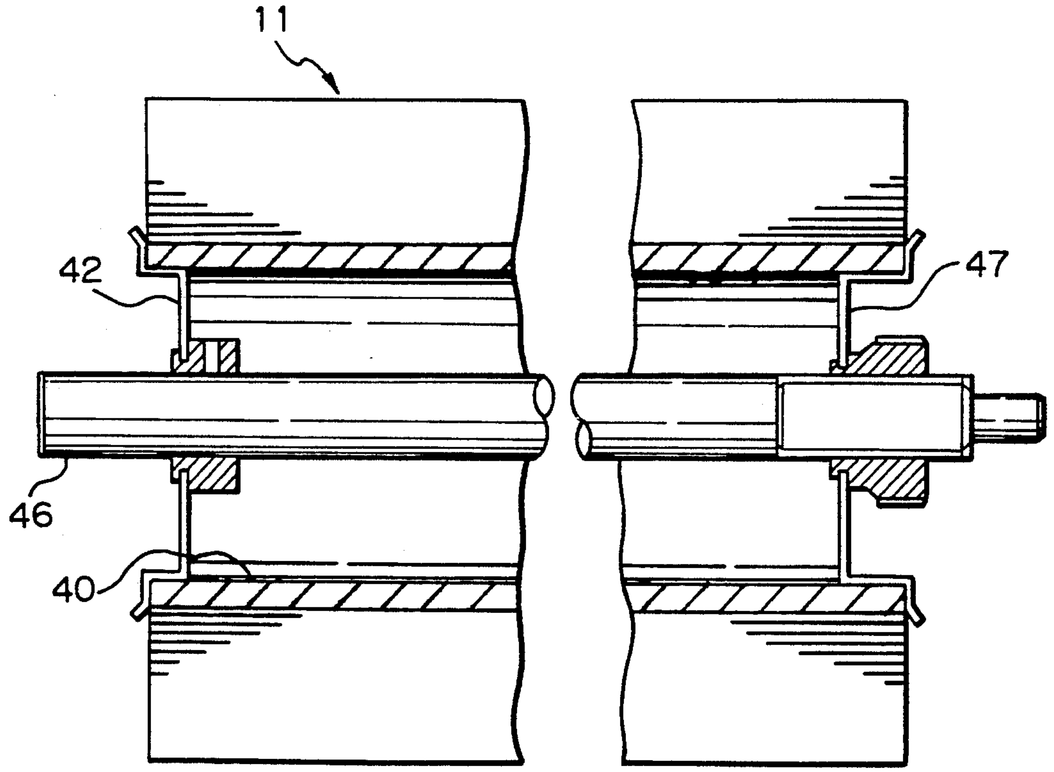
FIG. 6 is a view similar to FIG. 5, showing another specific construction of the external electrode.

FIG. 6 shows a modification of the configuration depicted in FIG. 5. As shown, the left stop 42 is affixed to a shaft 46 while a right stop 47 is in threaded engagement with the shaft 46. Implemented as a disk, each of the stops 42 and 47 supports the core member 40 by the peripheral portion thereof. The peripheral portion of each stop 42 or 47 contacts the inner periphery and end of the core member 40, but it is bent away from the roll 11 so as not to contact the medium A. When use is made of the core member 40, the conductive agent 20 may be applied from the roll ends 12 to the ends and inner periphery of the core member 40 in order to set up electrical connection between the roll ends 12 and the inner periphery of the core member 40. Alternatively, when the core member 40 itself is used to form a conductive path, it may be made of metal or similar conductor to further enhance sure electrical connection.

Hereinafter will be described a fifth embodiment of the present invention implementing the electrical connection between the recorder and the conductive layer of a recording medium of the kind which allows a high quality image to be formed over substantially the entire area thereof and the rear of which is not easy to be conductive.

In the embodiments shown and described, the conductive layer of the recording medium is grounded via the conductor which is held in contact with the end of the roll of the medium. Therefore, when the roll is situated at a substantial distance from the record head 2 within the recorder, the resistance of the conductive layer increases in the part of the medium which intervenes between the roll and the record head 2. Then, it is likely that the potential providing the conductive layer with the function of an electrode cannot be maintained at the position where the conductive layer faces the record head 2. The recording medium, therefore, should preferably be connected to ground even at a position adjacent to the record head 2, desirably at the position where the medium faces the head 2. In light of this, the fifth embodiment which will be described applies a conductive agent or paint to the recording medium from the opposite sides where the conductive layer is exposed to the rear.

Figure 7:
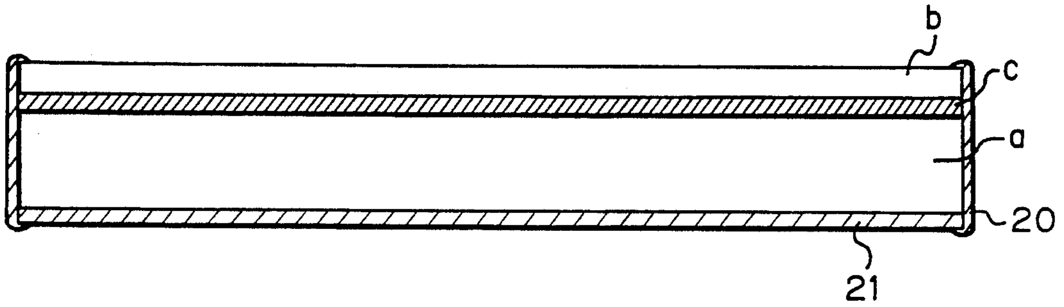
FIG. 7 shows a fifth embodiment of the present invention.

Specifically, as shown in FIG. 7, this embodiment has a laminate of an insulative substrate a, a conductive layer c overlying the substrate a, and a dielectric layer b overlying the conductive layer c. The conductive layer is exposed to the outside at opposite side edges of the laminate. A conductive paint is applied to the entire rear surface of the substrate a to form a conductive film 21. The conductive paint 20 is applied to opposite side edges of the laminate or medium and connected to the conductive film 21. Preferably, the insulative substrate a is constituted by a film of synthetic resin or synthetic paper which renders the resulting medium opaque, glossy, white and smooth and is, therefore, desirable from the image quality standpoint. The conductive paint 20 existing on the side edges of the recording medium electrically connects the conductive layer c of the medium to the conductive film 21 provided on the rear of the medium. The conductive layer c, therefore, can be grounded via the rear of the medium, as in a conventional arrangement.

Usually, the conductive layer of the recording medium appears at opposite side edges of the medium when the medium is cut. Hence, this embodiment is practicable only if the conductive paint is applied to such side edges of the recording medium where the conductive layer is exposed to the outside. However, a production line for producing a roll of recording medium is generally so constructed as to roll up the medium while cutting it. It follows that exerting loads on the side edges of the medium being cut and rolled up would cause the medium to shift or to crease, preventing the medium from being neatly rolled up. A sixth embodiment which will be described eliminates this problem.

Figure 8A:
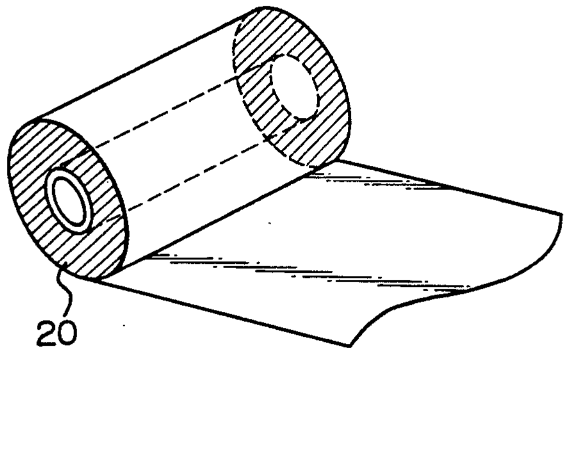
FIG. 8A is a perspective view of sixth embodiment of the present invention.
Figure 8B:
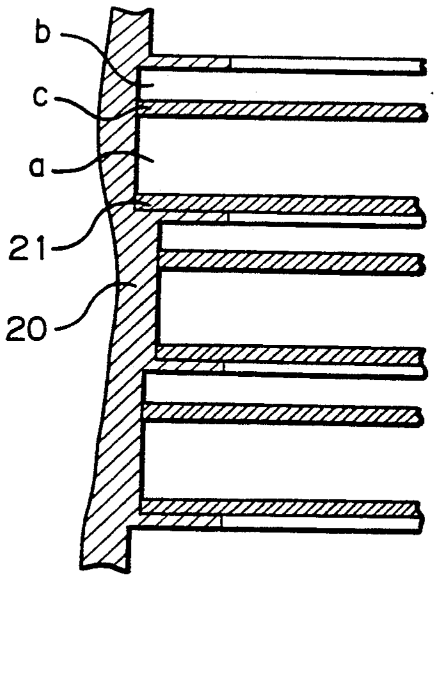
FIG. 8B is a fragmentary section associated with FIG. 8A.

As shown in FIGS. 8A and 8B, the sixth embodiment also has the laminate of insulative substrate a, conductive layer c, and dielectric layer b. The conductive layer c is exposed to the outside at both side edges of the laminate. After a conductive paint has been applied to the entire rear surface of the substrate a to form the conductive film 21, the laminate or recording medium is rolled up. Then, the conductive paint 20 is applied to opposite ends of the roll to connect the conductive layer c to the conductive film 21. As shown in FIG. 8A, when the medium is paid out from the roll, the conductive paint 20 on both ends of the roll is locally broken. Then, it is likely that the electrical connection between the conductive layer c and the conductive film 21 is locally interrupted. Nevertheless, the conductive layer c is sufficiently grounded due to the other part of the conductive layer 20 which has not been broken. Assume that the conductive paint 20 has a relatively low viscosity. Then, when the paint 20 is applied to the ends of the roll of recording medium, it infiltrates into the recording area of the medium via the ends of the latter due to capillarity and thereby not only makes part of the medium unusable but also adheres the successive turns of the roll of recording medium to each other. If the paint 20 has an adequate viscosity, the amount of infiltration will be reduced to allow the film of paint 20 to be sequentially broken by the thickness of the medium and remain on the edges of the medium.

In summary, it will be seen that the present invention provides an electrostatic recording medium having various unprecedented advantages, as enumerated below.

(1) Since an external electrode is held in contact with an end of a roll of recording medium, electric connection is desirably set up without the roll, as distinguished from the medium paid out from the roll, being bent despite a relatively high pressure exerted thereon sideways. In addition, the entire surface of the medium is usable to record images.

(2) Since a conductive agent is applied to the end of the roll of recording medium, it insures electrical connection between the external electrode and a conductive layer included in the medium. Further, the conductive agent prevents the roll of medium from loosening.

(3) Since a metallic plate and/or metallic foil is directly provided on the end of the roll of recording medium, the conductive layer of the medium and the metallic plate, for example, contact each other over a relatively broad area. As a result, the electrical connection between the metallic plate and the external electrode is further enhanced. If a conductive agent is applied to the roll end with which the metallic plate and/or the metallic foil is to contact, the roll is further prevented from loosening. To achieve the upmost effect, the roll end and the metallic plate, for example, may be connected together by an adhering conductive agent.

(4) A conductive agent is applied to an end of a core member to connect the conductive layer of the medium to the external electrode. This insures the electrical connection without exerting any load on the medium, despite that the conductor is pressed against the end of the core member.

(5) The medium is wound around a hollow cylindrical core member. The conductive layer of the medium is, therefore, connected to ground via the inner periphery of the core member and the recorder. This is successful in reducing the number of parts and elements.

(6) A conductive agent is applied to the rear of the medium as well as the side edges of the medium where the conductive layer is exposed. The conductive layer is connected to such a conductive agent or film provided on the rear of the medium by the conductive agent provided on the side edges of the medium. Hence, the conductive layer can be grounded via the rear of the medium and the recorder. It follows that the entire area of the recording medium can be used to form images.

Various modifications will become possible for those skilled in the art after receiving the teachings of the present disclosure without departing from the scope thereof.

What is claimed is:

1. An electrostatic recording medium which is configured as a roll, comprising:

a conductive layer partly exposed to the surrounding environment at at least one of axially opposite ends of said roll of said recording medium; and connecting means provided on said at least one end of said roll for electrically connecting said conductive layer to a recording head.

2. A recording medium as claimed in claim 1, wherein said connecting means comprises a conductive agent applied to said at least one end of said roll.

3. An electrostatic recording medium which is usable with an electrostatic recorder and is configured as a roll, comprising:

a conductive layer partly exposed to the surrounding environment at at least one of axially opposite ends of said roll of said recording medium; and connecting means provided on said at least one end of said roll for electrically connecting said conductive layer to said recorder.

4. A recording medium as claimed in claim 3, wherein said connecting means comprises a conductive agent applied to said at least one end of said roll.

5. A recording medium as claimed in claim 4, wherein said connecting means further comprises a conductive plate provided on said conductive agent between said conductive agent and said recorder.

6. A recording medium as claimed in claim 5, wherein said conductive plate comprises a metallic plate.

7. A recording medium as claimed in claim 5, wherein said conductive plate comprises metallic foil.

8. A recording medium as claimed in claim 3, wherein said connecting means further comprises a conductive plate provided on said at least one end of said roll.

9. A recording medium as claimed in claim 8, wherein said conductive plate comprises a metallic plate.

10. A recording medium as claimed in claim 8, wherein said conductive plate comprises metallic foil.

11. A recording medium as claimed in claim 3, further comprising a core member around which said recording medium is wound.

12. A recording medium as claimed in claim 11, wherein said connecting means comprises a conductive agent applied from said at least one end of said roll to a corresponding end of said core member.

13. A recording medium as claimed in claim 11, wherein said core member has a hollow cylindrical configuration, said connecting means comprising a conductive agent applied from said at least on end of said roll to the inner periphery of said core member.

14. A recording medium as claimed in claim 4, wherein said connecting means further comprises a conductive agent applied to the rear of said recording medium and electrically connected to said conductive agent applied to said at least one end of said roll.

* * * * *